(12) United States Patent
Moosburger et al.

(10) Patent No.: US 7,451,069 B2
(45) Date of Patent: Nov. 11, 2008

(54) SIMULATION PLAYER

(75) Inventors: Rudolf Josef Moosburger, Kew (AU); Peter James Feder, Hawthorn East (AU)

(73) Assignee: VPISystems Inc., Holmdel, NJ (US)

( * ) Notice: Subject to any disclaimer, the term of this patent is extended or adjusted under 35 U.S.C. 154(b) by 506 days.

(21) Appl. No.: 10/713,052

(22) Filed: Nov. 17, 2003

(65) Prior Publication Data

US 2004/0107085 A1 Jun. 3, 2004

(30) Foreign Application Priority Data

Nov. 18, 2002 (AU) .............................. 2002952700

(51) Int. Cl.
  G06F 17/50 (2006.01)
  G06F 9/44 (2006.01)
  G06F 9/45 (2006.01)
  G06Q 30/00 (2006.01)
(52) U.S. Cl. .................. 703/14; 703/1; 703/2; 703/13; 703/20; 703/22; 705/26
(58) Field of Classification Search .................. 703/14
  See application file for complete search history.

(56) References Cited

U.S. PATENT DOCUMENTS

| | | | |
|---|---|---|---|
| 6,102,961 A * | 8/2000 | Lee et al. ........................ | 716/1 |
| 6,345,239 B1 * | 2/2002 | Bowman-Amuah ............ | 703/6 |
| 6,687,710 B1 * | 2/2004 | Dey ........................ | 705/36 R |
| 6,970,814 B1 * | 11/2005 | Ashley et al. ................. | 703/14 |
| 2002/0059054 A1 * | 5/2002 | Bade et al. .................... | 703/20 |

OTHER PUBLICATIONS

Benini et al. 'Virtual Simulation of Distributed IP-based Designs'. ACM 1994.*
Hauck et al. 'Data Security for Web-Based CAD'. ACM, 1998.*
Reutters et al. "An Efficient Reuse System for Digital Circuit Design", 1998.*
Delpasso et al. "Virtual Simulation of distributed IP-based Designs" ACM 1999.*
Wilsey, Philip. "Web-based Analysis and Distributed IP" 1999.*
Reutter et al. "An Efficient Reuse System for Digital Circuit Design." 1998.*
Bogliolo et al. "Specification and Validation of Distributed IP-based Designs with JavaCAD" 1999.*
Gajski et al. "Reuse and Protection of Intellectual Property in the SpecC System" IEEE 2000.*
Wen et al. "Concurrent-Simulation-Based Remote IP Evaluation over the Internet for System-on-a-Chip Design" 2001.*
Fin et al. "A Web-CAD Methodology for IP-Core Analysis and Simulation" ACM 2000.*
Hauck et al. "Data Security for Web-Based CAD" IEEE Transactions on Design Automation of Electronic Systems: 1998.*

* cited by examiner

Primary Examiner—Kamini Shah
Assistant Examiner—Shambhavi Patel
(74) Attorney, Agent, or Firm—Banner & Witcoff, Ltd.

(57) ABSTRACT

A system for providing a runnable computer simulation model comprises a design automation software product for enabling a designer to create a simulation model including interconnected component and/or subsystem models. The system also comprises a simulation content file creation means for creating a simulation content file that includes information describing the simulation model; and a simulation player software product including means for reading the simulation content file. The simulation player software product enables an end user to run the simulation model based upon the information in the simulation content file, but does not allow the end user to add or remove component models, subsystem models or interconnections of the simulation model.

52 Claims, 9 Drawing Sheets

SIMULATION PLAYER

CROSS REFERENCE TO RELATED APPLICATIONS

This application is based upon and claims the benefit of priority from the prior Australian Patent Application No. 2002952700, filed Nov. 18, 2002, the entire contents of which are incorporated herein by reference.

FIELD OF THE INVENTION

The present invention relates to computer simulation of optical, opto-electronic, and electronic systems and components and, in particular, discloses a method for distributing runnable simulation models of such systems and components as a means of promoting their features and characteristics.

BACKGROUND OF THE INVENTION

Computer-aided design (CAD), and design automation tools incorporating computer simulation, have become indispensable in the design and development of optical, opto-electronic, and electronic systems and components. The ability to simulate a design before committing to the expense of construction and testing has resulted in great savings in cost and development time. Essential to the effectiveness of simulation tools is the availability of models of the individual components that accurately reflect the characteristics of real, commercially available devices. End users of simulation software may construct such models for themselves by either measuring the properties of components for themselves, or by extracting the required data from manufacturers' product literature. These approaches suffer from significant disadvantages. Experimental characterization requires the acquisition of sample components, access to a suitably equipped test and measurement laboratory, and furthermore is a time-consuming process. And product literature may not contain sufficient information to construct suitably accurate models, since manufacturers often consider detailed technical data to be valuable proprietary information. Additionally, a system in which all end users are replicating these tasks is inefficient, and leads to generally increased costs of production.

It is therefore preferable that simulation models of components and systems are developed and provided by their manufacturers rather than by the end users. Component and system vendors, for their part, wish to obtain a return on their investment in this development in the form of improved access to target markets and increased sales. In some markets formal or de facto standards may emerge that define a widely accepted format for the exchange of models such that a single model can be developed that will be compatible with most simulation software. This is particularly the case when the market is very large and relatively mature. In emerging and smaller markets, there are often fewer simulation products available, and these may be relatively expensive and less widely deployed. Furthermore, these products may support competing proprietary format models.

In such markets there is therefore a need that has not been previously addressed for software and methods that enable component and system vendors to leverage their investment in simulation models in the marketing of their products even when customers do not own compatible simulation software. In particular, a significant benefit can be obtained by vendors if they are able to distribute simulation models of their products to potential customers in a form whereby the customers are able to run the models and thus assess the suitability of the products for their applications. However, this has not been generally possible in the past unless the customers also own or have access to the simulation software tools required in order to run the models. As previously mentioned, in markets in which such software is expensive and not widely deployed, it is likely that a significant number of potential customers will not own or have access to suitable simulation software, thus impacting adversely upon the vendors' ability use simulation models as a means of promoting and marketing their products.

One approach to the problem of making a basic simulation capability widely available at a nominal cost that has been employed in the past is the distribution of a "demonstration", "restricted" or "light" version of the simulation software tool. In this method, a version of the tool is distributed for free, or at nominal cost, that has been modified to restrict its functionality in some specified manner. For example, the "demonstration" tool may have the full functionality of the commercial tool with the exception that the standard "save" feature is disabled. In such a case, the tool is useful for trial purposes, or for running pre-existing set-ups, but cannot practically be used for ongoing design and development work, for which purpose a full commercial version of the tool must be purchased.

However, the distribution of a "demonstration" version of the software does not satisfactorily address the needs of component and systems vendors who wish to use simulation models for the marketing and promotion of their own products. "Demonstration" software is primarily distributed as a means for the developer of the simulation software to promote and market the software tool itself. As such, it is unsuitable as a marketing aid for components and systems vendors for reasons including the following. First, "demonstration" software is substantially similar in appearance and use to the full commercial version of the software. It is thus relatively complex software that requires a significant learning curve by the end user, which acts as a disincentive to using it simply to view a vendor's promotional material. Second, while "demonstration" software has some restrictions built in, it does not generally prevent the user from constructing simulation set-ups, or modifying pre-existing ones, as a means of testing the functionality of the software. This is a disadvantage for a vendor who naturally wishes to prevent the end user from using a promotional model in an uncontrolled and unintended manner that may result in the capabilities of a component or system being misrepresented. Third, even a restricted "demonstration" version of a powerful simulation software product is typically a major application that requires significant resources, including memory and hard-disk storage, and therefore most users would be unwilling to install such a package on their computers simply as a means to view vendor promotional material.

There exists therefore a need for an improved method of distributing runnable simulation models for marketing and promotional purposes that avoids the disadvantages of the existing methods that rely on the use of a "demonstration", "restricted" or "light" version of a simulation software tool.

SUMMARY OF THE INVENTION

It is accordingly an object of the present invention to provide for a new method of, and software applications for, distributing runnable simulation models.

In one aspect the present invention provides a system for providing a runnable computer simulation model comprising:

a design automation software product for enabling a designer to create a simulation model including interconnected component and/or subsystem models;

simulation content file creation means for creating a simulation content file that includes information describing the simulation model; and a simulation player software product including means for reading the simulation content file, that enables an end user to run the simulation model based upon the information in the simulation content file, but which does not allow the end user to add or remove component models, subsystem models or interconnections of the simulation model.

Advantageously, the system of the present invention enables a designer to create a simulation model using a sophisticated design automation tool that may be, for example, a model of a specific product. A simulation content file may then be provided to an end user, who may perform a "virtual" evaluation of the product by way of running the simulation model using the simulation player software product. This product can be made available cheaply and easily to the end user, who does not therefore need to possess a copy of the complex and expensive design automation tool in order to benefit from the simulation model. The simulation player software product can also be made significantly more simple to use than a sophisticated design automation tool.

In a preferred embodiment, the design automation software product enables the designer to identify parameters of the simulation model, component models and/or subsystem models that may be inspected and/or varied by the end user, and to specify one or more allowed values of said parameters, the simulation content file further includes information identifying said parameters and allowed values, and the simulation player software product enables the end user to vary only said identified parameters of the simulation model, component models and/or subsystem models to only said allowed values.

Accordingly, a further advantage is provided in that the designer is able to allow the end user to exercise some control over the parameters of the simulation, in order, for example, to evaluate different use scenarios, while still being able to prevent the end user from operating the simulation model outside of its intended use parameters.

The simulation model preferably comprises an optical, opto-electronic or electronic simulation model.

In a preferred embodiment, the information describing the simulation model includes information specifying the component models and/or subsystem models comprising the simulation model, and the interconnections therebetween.

Also in a preferred embodiment, the information describing the simulation model includes simulation instructions specifying a sequence of operations to be carried out during running of the simulation model by the simulation player software product.

The information describing the simulation model may include information defining a graphical representation of the simulation model, and the simulation player software product may thus able in use to display said graphical representation on a computer display. In a preferred embodiment, including a separate graphical representation advantageously enables the simulation player software to be considerably simplified by avoiding the need for it to include a database relating to the representations of component and subsystem models, since all the required information for graphical display is contained within the simulation content file.

Preferably the simulation content file creation means encrypts at least a part of the simulation content file to prevent unauthorized parties from accessing and/or altering the information describing the simulation model. This feature beneficially ensures that the work of the designer is protected, as well as ensuring that end users cannot create simulation content files for execution using the simulation player software product other than by use of the design automation product.

Preferably the allowed values of said parameters comprise one or both of a range of values specified as a minimum value and a maximum value, and a list of discrete values.

In a preferred embodiment, the simulation content file creation means comprises a software component for use with the design automation software product.

The simulation content file further comprises content including one or more of data and/or document files, a digital image, a web site URL, and contact details, and wherein a user is able to control the content file creation component to include said content at the time of creation of the file. This feature provides the particular advantage to a designer or other provider of content files that they are able to promote themselves and any products represented by the simulation model by enabling the end user of the simulation player product to identify the provider and access contact details directly from within the player product.

Accordingly, the simulation model may comprise a model of a component or system product, and the runnable computer simulation model is provided for distribution by a vendor for evaluation of said product by prospective customers.

The document and/or data files may comprise data and promotional information relating to said product, and the simulation player software product preferably enables the end user to open said files and inspect their contents.

The digital image may comprise a company logo of said vendor, and the simulation player software product is preferably able in use to display the logo on a computer display.

The web site URL may identify a web site of said vendor, and the simulation player software product preferably enables the end user to open a web browser at said web site.

The contact details preferably include one or more of a physical address, an email address, a telephone number and a fax number, and the simulation player software product is able in use to display said contact details on a computer display.

In another aspect the present invention provides a method of providing a runnable computer simulation model comprising the steps of:

a designer creating a simulation model using a design automation software product, said simulation model including interconnected component and/or subsystem models;

creating a simulation content file that includes information describing the simulation model;

providing the simulation content file to an end user; and the end user running the simulation model using a simulation player software product that includes means for reading the simulation content file, and that enables an end user to run the simulation model based upon the information in the simulation content file, but which does not allow the end user to add or remove component models, subsystem models or interconnections of the simulation model.

The step of providing the simulation content file may comprises distributing the file using an information network, and the information network may be the internet. In particular, in preferred embodiments distribution is achieved by making the simulation content file available for download from a web site. The advantage is thus provided that designers and other providers of content files may easily make such files available to end users, who may easily obtain the files by simply downloading them from the providers' web sites.

In a further aspect, the present invention provides a computer program product comprising a computer readable storage medium having embodied upon it computer readable instructions that on computer execution implement:

a design automation software environment for enabling a designer to create a simulation model including interconnected component and/or subsystem models; and simulation content file creation means for creating a simulation content file that includes information describing the simulation model, for use with a simulation player software product that enables an end user to run the simulation model based upon the information in the simulation content file but which does not allow the end user to add or remove component models, subsystem models or interconnections of the simulation model.

The simulation content file creation means may comprise a software component forming an element of the design automation software environment.

In yet another aspect, the present invention provides a computer program product comprising a computer readable storage medium having embodied upon it computer readable instructions that on computer execution implement:

simulation content file reading means for reading a simulation content file that includes information describing a simulation model, which model includes interconnected component and/or subsystem models; and a simulation player software environment that enables an end user to run the simulation model based upon the information in the simulation content file, but which does not allow the end user to add or remove component models, subsystem models or interconnections of the simulation model.

In a preferred embodiment, the simulation content file reading means comprises a software component forming an element of the simulation player software environment.

In a further aspect, the present invention provides a system for providing a runnable computer simulation model of optical, opto-electronic or electronic components or systems, said system comprising:

an design automation software product for enabling a designer to create a simulation model of optical, opto-electronic or electronic components or systems, including interconnected component and/or subsystem models;

a simulation content file creation software component for use with said design automation software product for creating a simulation content file that includes information describing the simulation model; and a simulation player software product including a software component for reading said simulation content file, that enables an end user to run the simulation model based upon the information in the simulation content file, but which does not allow the end user to add or remove component models, subsystem models or interconnections of the simulation model.

In a still further aspect, the present invention provides a method of providing a runnable computer simulation model of optical, opto-electronic or electronic components or systems, said method comprising the steps of:

a designer creating a simulation model of optical, opto-electronic or electronic components or systems, using a design automation software product, said simulation model including interconnected component and/or subsystem models;

creating a simulation content file that includes information describing the simulation model;

providing the simulation content file to an end user; and the end user running the simulation model using a simulation player software product that includes means for reading the simulation content file, and that enables an end user to run the simulation model based upon the information in the simulation content file, but which does not allow the end user to add or remove component models, subsystem models or interconnections of the simulation model.

In another aspect, the present invention provides a computer program product comprising a computer readable storage medium having embodied upon it computer readable instructions that on computer execution implement:

a design automation software environment for enabling a designer to create a simulation model of optical, opto-electronic or electronic components or systems, including interconnected component and/or subsystem models; and a simulation content file creation software component for use with said design automation software product for creating a simulation content file that includes information describing the simulation model for use with a simulation player software product that enables an end user to run the simulation model based upon the information in the simulation content file but which does not allow the end user to add or remove component models, subsystem models or interconnections of the simulation model.

In a further aspect, the present invention provides a computer program product comprising a computer readable storage medium having embodied upon it computer readable instructions that on computer execution implement a simulation player software environment including a software component for reading a simulation content file that includes information describing an optical, opto-electronic or electronic simulation model, which model includes interconnected component and/or subsystem models wherein the simulation player software environment enables an end user to run the simulation model based upon the information in the simulation content file, but which does not allow the end user to add or remove component models, subsystem models or interconnections of the simulation model.

BRIEF DESCRIPTION OF THE DRAWINGS

Preferred and other embodiments of the present invention will now be described by way of illustration only with reference to the accompanying drawings in which.

DETAILED DESCRIPTION OF THE PREFERRED EMBODIMENT

In the preferred embodiment there is provided a method and software applications for distributing runnable simulation models of optical, opto-electronic, or electronic components and systems.

Figure 1:
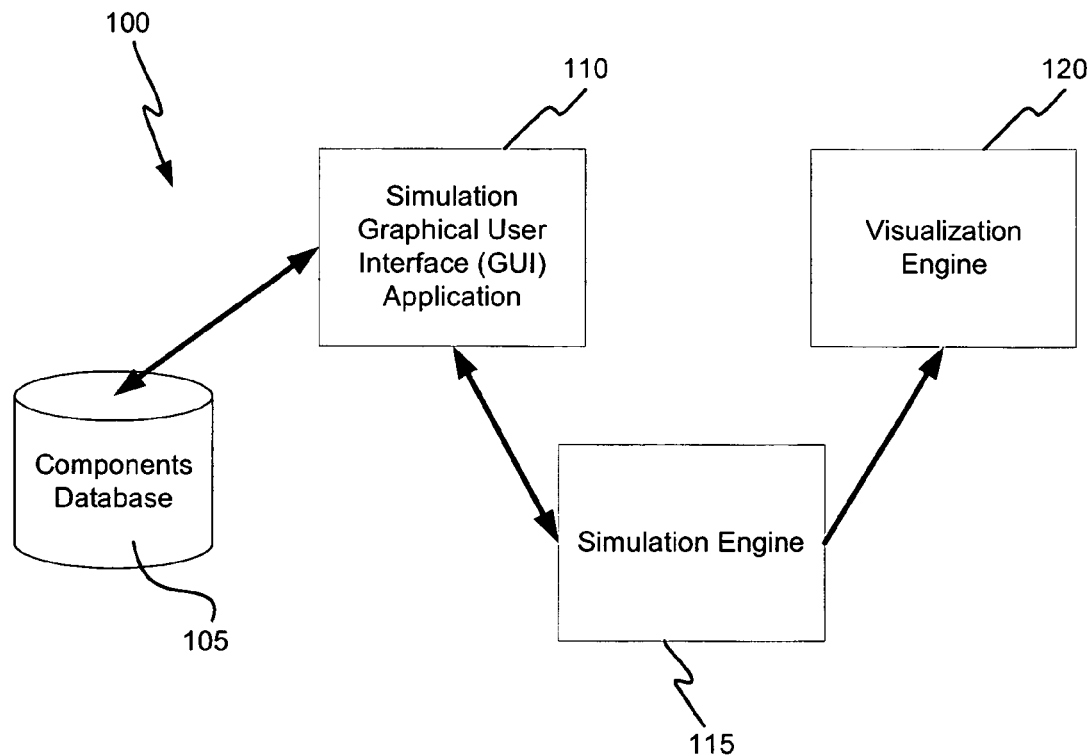
FIG. 1 illustrates the major software components of a fully featured simulation software application that has been adapted for use in a preferred embodiment of the present invention.

The preferred method includes the step of creating an optical, opto-electronic, or electronic simulation model along with associated documentation, data, marketing materials and a set of predetermined user-controllable parameters and parameter ranges. Existing commercially available design automation software tools (also referred to herein as simulation software tools), such as e.g. VPItransmissionMaker from VPIsystems Inc., provide a design automation software environment that can be used by a designer to create a simulation model set-up, however such prior-art software is not able to create the "simulation content" files, as described later with reference to FIG. 2, that are a feature of the present invention. In the preferred embodiment, a design automation software tool is adapted in use to include this additional functionality. FIG. 1 illustrates the components of an embodiment of a simulation software tool 100 according to the present invention. FIG. 1 shows that the simulation software tool 100 may be described as including four major components:

- A components database 105 that contains definitions of all simulation models known to the system. For each component, this data includes, but is not limited to: the icon that represents the component within the Graphical User Interface (GUI) 110; the number, location and type of all input and output ports; the user-controllable parameters; and any additional data that may be required to define the behavior of the component. Each component may be a primitive module, the behavior of which is modeled by program code within the simulation engine 115, or a compound module, defined by an interconnection of primitive modules and/or other compound modules.

- The GUI 110 that provides the user interface to the simulator. The user interacts with the GUI to build simulation set-ups in the form of schematics including interconnected components selected from the components database 105. The GUI also enables the user to perform functions such as loading and saving of simulation set-ups and results, and to initiate and control simulation.

- The simulation engine 115 that performs numerical simulation of user-created set-ups. In the preferred embodiment, the simulation engine is controlled by the GUI 110, which generates a series of simulation instructions that define the primitive modules used in the simulation, their parameters and connectivity, and the sequence of operations to be carried out in completing the simulation.

- The visualization engine 120 that displays graphical results from the simulation in the form of e.g. waveforms, graphs and tables. In the preferred embodiment, the display of visualized results is initiated by simulation modules that gather simulation results and pass them to the visualization engine.

In the particular embodiment of the simulation software tool 100 described herein, the GUI 110, simulation engine 115 and visualization engine 120 are separate programs that communicate with each other via the host computer file system and standard methods of interprocess communication supported by the host operating system. However, it will be appreciated that alternative embodiments in which these components are integrated into a smaller number of separate programs are also possible, and may also be employed in an embodiment of the present invention.

The simulation software tool 100 is used to create and test a set-up of a simulation model that may, for example, demonstrate the functionality and characteristics of a product such as a component or a system. The simulation software tool is also used to define a set of parameters that the eventual user of the player application will be able to control, and to define the default settings and allowed ranges of the parameters. The simulation software tool also enables files to be associated with the simulation model. These files may include input data files required by the simulation models used in the set-up. Additionally or alternatively they may include document files, containing information such as, e.g., product data or promotional material. It will be appreciated that such capabilities are common features provided by a number of simulation software tools available in the prior art.

As previously mentioned, in the preferred embodiment of the present invention, the simulation software tool 100 is adapted in use to include the additional capability to create one or more simulation content files, e.g. 125. Each file is a structured collection of data that may be stored e.g. in computer memory or on magnetic or optical storage media, and which may subsequently be transferred e.g. via a computer network or on magnetic or optical storage media. Advantageously in the preferred embodiment only a single file is generated, since this simplifies the subsequent distribution of the content, however it will be appreciated that alternative embodiments in which the content is distributed within multiple files are also possible.

Figure 2:
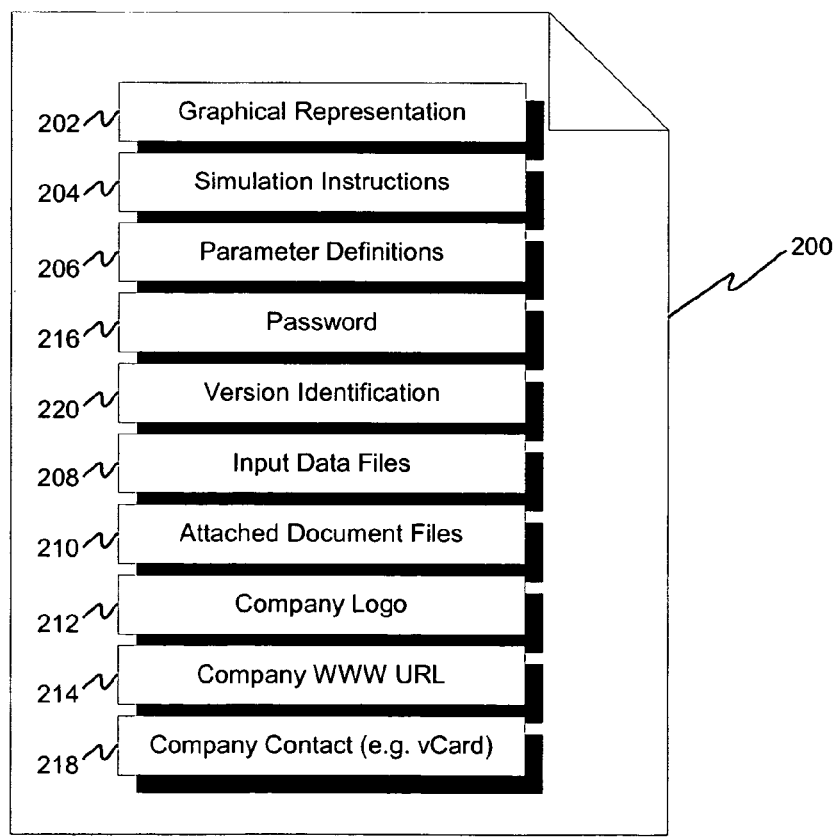
FIG. 2 illustrates the content of a simulation content file according to a preferred embodiment of the present invention.

The contents of the preferred embodiment of the simulation content file 125 are illustrated schematically in FIG. 2. The simulation content file 125 is a single computer-readable file that contains the following information associated with the simulation set-up:

- A graphical representation of the simulation schematic 202. In the preferred embodiment, this representation is provided using the Scalable Vector Graphics (SVG) format. Advantageously, since the SVG format has been adopted by the World Wide Web Consortium, it enables the player application to use third-party plug-in software to display the image, reducing the cost of development and deployment of the player. Furthermore, this format enables the end user of the player content to view the schematic at different levels of magnification without loss of definition, as would occur if a raster format was used. It will be appreciated that although the SVG format provides these advantages, other image formats could also be used.

- A series of simulation instructions 204 that can be executed by the simulation engine in order to run the simulation set-up. In the preferred embodiment, the simulation instructions are the same as those generated by the GUI of the full-featured simulation software tool, which advantageously enables the same simulation engine to be used by the player application, which minimizes the incremental cost of developing and deploying the player. Preferably the simulation instructions are stored within the simulation content file in an encrypted format, advantageously preventing users of the player from modifying the simulation content.

Definitions 206 of the names, default values and allowed ranges of any parameters that may be set by the end user of the player content.

Data files 208 required by the simulation and/or document files 210 containing e.g. product data or promotional material.

In the preferred embodiment the simulation content file may contain the following additional information:

A bit-map image 212, typically including a representation of the company logo of the creator of the simulation content file. Advantageously, this image (when supplied) is automatically placed on the graphical representation of the simulation schematic in the player application where it acts as a promotional feature on behalf of the content creator. Preferably the simulation content file may also contain a World Wide Web Universal Resource Locator (URL) 214 representing e.g. a page at the Internet web site of the creator. In this case, when the user clicks on the company logo, a Web browser may be opened at the referenced page.

A password 216 that may be used to restrict access to the player content. By password-protecting the content file, the content creator may restrict access to the content to only those trusted recipients to whom the password is known.

A "virtual business card" (e.g. a "vCard" or other representation) 218, containing the contact details of a suitable person or organizational unit within the company providing the content. The vCard may be used by the player application to provide features such as, e.g. the contact details may be automatically added to the end-user's email address book, or a new email message window can be automatically opened to compose a message addressed to the contact person.

Version information 220, which may be used by the player application to ensure that the content within the simulation content file is compatible with the simulation engine used by the player application.

This additional information may be added to the simulation content file at the time of creation.

In the preferred embodiment, the simulation content file is formatted using the "ZIP" archive format. Advantageously, this format allows a number of separate original files to be stored within a single archive file, including any desired folder or directory hierarchy used to structure the relationships between the files. In the preferred embodiment, the schematic image 202, the simulation instructions 204, the virtual business card 218, the company logo 212, the data files 208 and document files 210, are initially separate files that are stored within the ZIP archive file during the simulation content file creation. The data files 208 and document files 210 are stored in separate folders within the ZIP archive, which avoids any possible conflicts between the names of these user-supplied files and the names of any other files within the ZIP archive. In addition to these files, a further file is stored within the simulation content file. This file is an XML (eXtensible Markup Language) file that contains the remaining information required in the simulation content file, including the parameter definitions 206, password 216, company URL 214 and version information 220. The XML file may also be used for any additional metadata required to describe the format or contents of the simulation content file.

It will be appreciated by persons skilled in the art that many alternative embodiments of the simulation content file are possible, and that such alternatives will fall within the scope of the present invention whether or not they offer all or some of the stated advantages of the preferred embodiment. For example, there are many other archive file formats in common use, including CAB, ARJ, LZH, TAR and JAR files, and any of these could be used interchangeably with the ZIP format. The information stored within the XML file could be stored in a single file using a different format (for example, a simple text file containing a list of keys and values), or could be stored in multiple files instead of using only one. Of course, an entirely proprietary simulation content file could be implemented that uses no formats or structures in common use, although the disadvantage of this approach is the additional cost associated with the development and implementation of a proprietary format file.

Optionally, the entire simulation content file is encrypted in order to prevent the end user, or any unauthorized third party, from gaining access to proprietary information that may be held within the file, or from modifying the content in any way.

Figure 3:
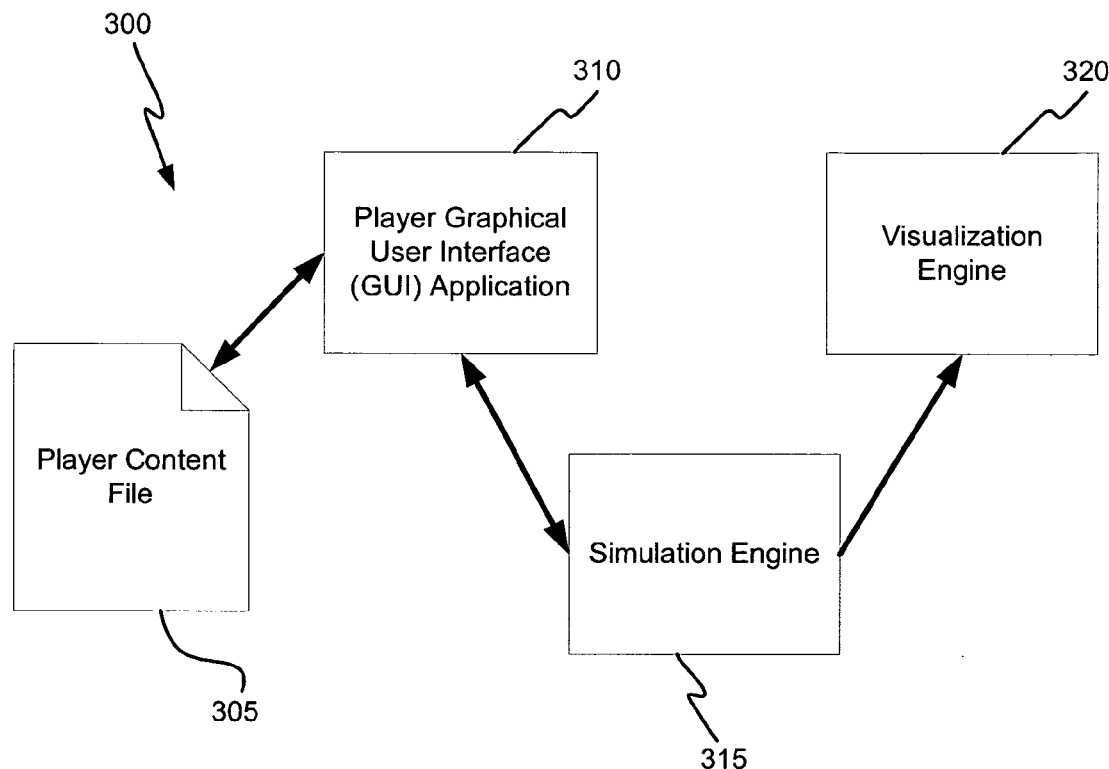
FIG. 3 illustrates the major software components of a player software application according to a preferred embodiment of the present invention.

As illustrated in FIG. 3, in a preferred embodiment a player software application 300 that provides a simulation player software environment for an end user includes three major components:

The player GUI 310 that provides the user interface to the simulator. The player GUI loads the simulation content file 125, and allows the user to view the simulation schematic, to view and set the parameters defined by the content creator, to open any attached documents, to access any attached vCard, and to run and stop the simulation.

The simulation engine 315 that performs numerical simulation of the set-up defined within the simulation content file 125. In the preferred embodiment, the simulation engine is controlled by the predetermined simulation instructions 204 contained within the simulation content file 105.

The visualization engine 320 that displays graphical results from the simulation in the form of e.g. waveforms, graphs and tables.

One advantage of this architecture in the preferred embodiment is that the simulation and visualization engines may be identical with those used by the fully featured design automation software application. This ensures that the investment in the development of these components is fully leveraged by the player application, and that the incremental cost of development and maintenance of the player is restricted to the cost associated with the GUI 310. A further advantage is that the player application is "light-weight" compared to the fully featured simulation application, since it does not include any of the functionality related to the creation and maintenance of designs, or the extensive components database that is required for the full application. The resulting reduction in the size of the application facilitates its ready distribution via online distribution channels such as e.g. a download from a Web site. Furthermore, the resulting reduction in complexity of the application ensures that the player application is simple to use, easy to install, and has a reduced requirement for resources such as hard-disk storage on the target computer, thus overcoming a number of disadvantages of the prior art methods that make use of a "demonstration", "restricted" or "light" version of a commercially available fully functionally simulation software tool.

Figure 4:
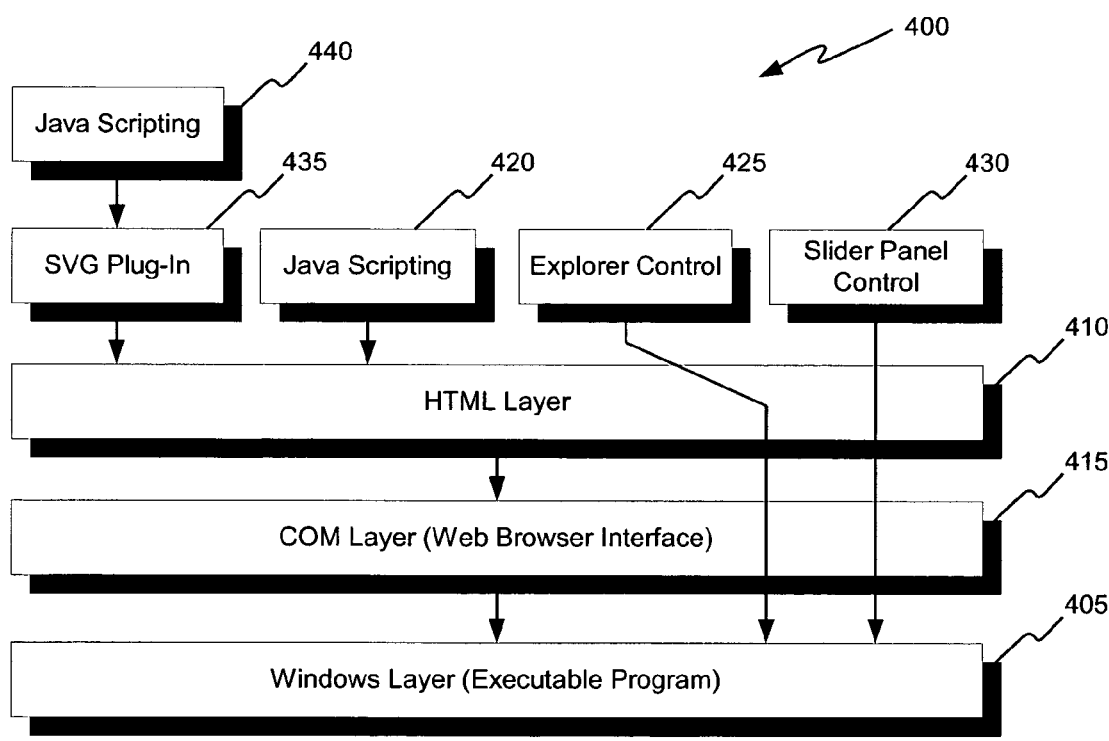
FIG. 4 illustrates the software architecture of a player GUI application according to a preferred embodiment of the present invention.

The software architecture 400 of the preferred embodiment of the player application implemented on the Microsoft Windows operating system platform is shown in FIG. 4. The basic component of the player application is a custom-designed executable program 405 that implements the core functionality of the player. This functionality includes: reading and decoding the simulation content file; setting parameter values and controlling the simulation engine; and coordinating the interactions between the user and various components of the graphical user interface (GUI).

The appearance of the GUI itself is defined using a Hypertext Mark-up Language (HTML) layer 410. Note that HTML is the same language that is also used to define the appearance of pages on the World Wide Web. This approach is different from that used by most software applications, which typically build a GUI by using individual calls to the Windows applications programming interface (API), either directly or via a library of more advanced functions. Using the HTML layer 410 provides two particular advantages in the player application. First, it reduces the size, complexity and development cost of the player by utilizing existing HTML technology rather than implementing application-specific code. Second, it provides the flexibility to redefine the appearance of the player using the standard HTML language, without any need to alter the application code itself. This allows the player appearance to be fully customized, and in particular enables it to be "branded" so that it can act as a promotional aid to companies such as component and systems vendor in coordination with their simulation content files.

In order to allow the application to display the GUI that is described by the HTML layer, the Windows Common Object Model (COM) is utilized. Specifically, a Web Browser COM control 415 is created to display the GUI. This control is pre-installed on all releases of the Windows OS in common usage, and advantageously provides all of the functionality necessary to interpret and display the GUI defined by the HTML layer 410.

To enable the user to interact with the GUI, Java Scripting 420 is used. Java scripting enables interactive features, such as animated buttons, to be implemented within the HTML framework, thus supporting full interactivity with the HTML layer 41 without extensive application-specific coding in the core application program 405.

Two features of the GUI use native Windows OS controls created and managed by the core program 405. The first of these features is a pane within the GUI window that displays any attached document files within the simulation content file, which is implemented using a standard Explorer control 425. This control allows the user to see icons representing the documents, along with other selected details, and allows the file attachments to be manipulated in the usual manner, e.g. the files may be opened, printed, copied etc. The second feature is a panel 430 within the GUI window that displays a set of slider and list controls that are used to set the values of the user-definable parameters. These two features require complex user interaction, and cannot be implemented in the HTML layer 410. However, their location within the GUI window can be defined using HTML, and therefore the complete configuration of the user interface at the HTML layer 415 is advantageously not compromised by the use of these native controls.

A Scalable Vector Graphics (SVG) viewer component 435 is used to display the schematic layout and company logo defined in the simulation content file. In the preferred embodiment, this component is the SVG viewer Web Browser plug-in that is available free of charge from Adobe Systems Incorporated. The SVG viewer integrates with the HTML layer via further Java scripting 440 to provide all the features required by the user for interacting with the schematic, such as panning and zooming. The SVG view plug-in may be obtained and installed by the user independently of the player application (some users may already have this plug-in installed), or it may be distributed and installed along with the player.

In summary, the specific advantages provided by the software architecture 400 of the player application are: reduced development time and cost; reduced application size and complexity; and increased flexibility in defining the appearance of the application, including the ability to provide total "branding" of the player by content providers.

It will be appreciated by persons skilled in the art that other software architectures may be employed to achieve the required functionality of the player application, and that such alternatives will fall within the scope of the present invention whether or not they offer all or some of these stated advantages. For example, a functional player application could be implemented on the Microsoft Windows platform as a single Windows executable program developed specifically to provide equivalent functionality to the complete set of components shown in FIG. 4. While it would be expected that such an implementation would incur higher costs of development and maintenance, and offer a lesser degree of flexibility and configurability than the preferred embodiment, it could nonetheless include all the key inventive features of the present invention.

The preceding description of the preferred embodiment may be further illustrated with reference to FIGS. 5 to 10, which show images of the fully-featured simulation software application GUI 500, the player application GUI 600, a visualizer output display 700, a parameter definition dialog box 800, a parameter editor window 900, and an alternative embodiment of the player application GUI 1000.

Figure 5:
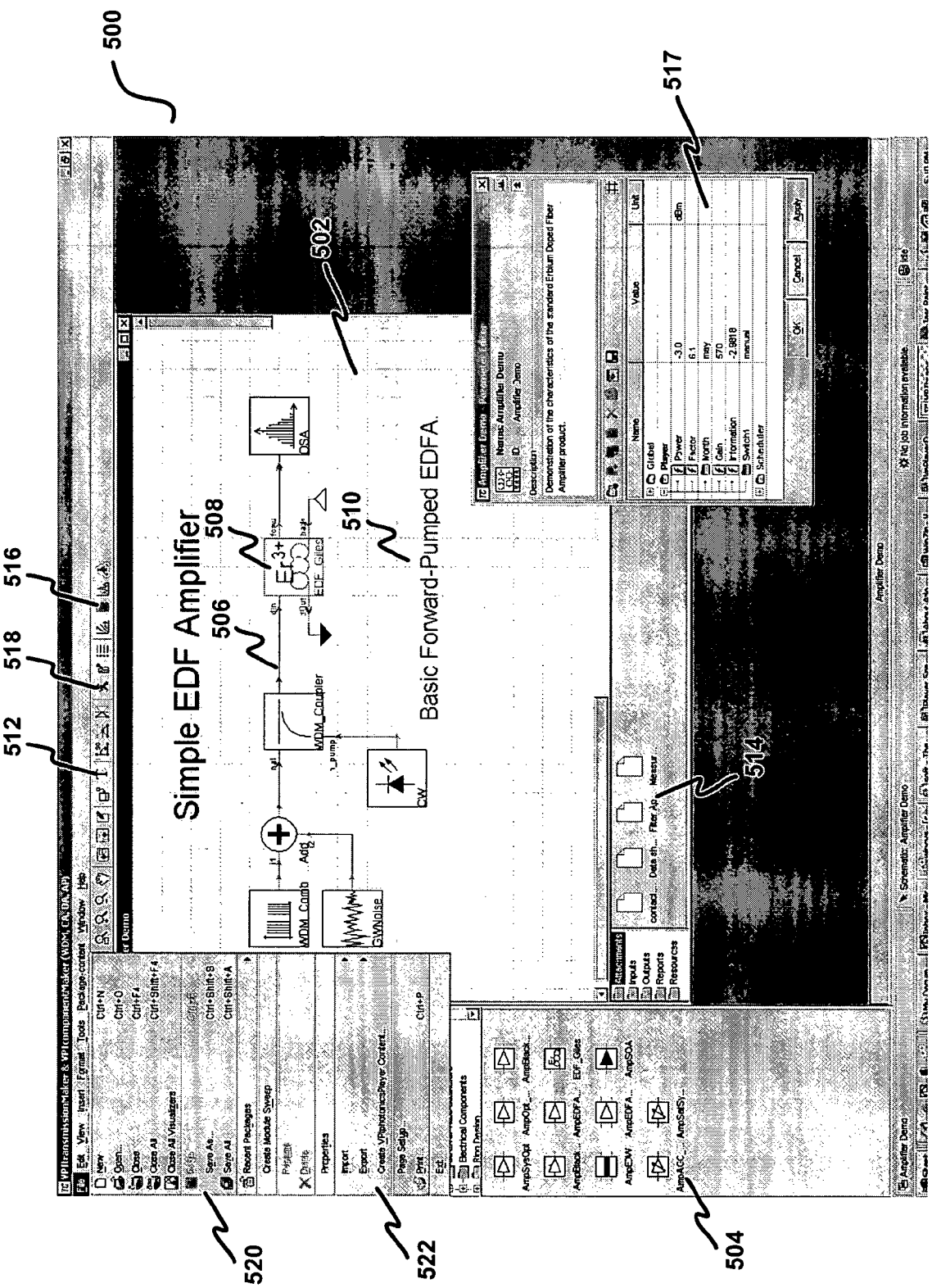
FIG. 5 shows the main application window of a fully featured simulation software application according to a preferred embodiment of the present invention.

FIG. 5 shows the application window 500 generated by a simulation software application GUI 110 that has been adapted according to the preferred embodiment of the present invention.

Within the application window 500, a schematic set-up 502 is being edited. The user is able to add components to the set-up from the module palette 504, by selecting them using an input device such as a mouse, and then dragging them onto the schematic 502. The components can be connected together by creating "wires" 506, again using an input device such as a mouse to select the terminals of the components that are to be connected.

The parameters defining the behavior of each module, e.g. 508, in the set-up can be viewed and edited by selecting the module and opening a parameter editor window, e.g. 517. In the embodiment shown in FIG. 5 the parameter editor window can be opened by double-clicking on the selected component with the mouse, or by selecting an option "Edit Parameters" from a menu that is displayed if the user clicks the right mouse button on the selected component.

Additionally, text e.g. 510 may be added to the schematic for the purposes of explanation or annotation by selecting the Text tool button 512. Once the Text button has been selected by clicking with the mouse, text can be added to the schematic 502 by clicking with the mouse in the desired location, and then typing the required text using the keyboard.

Additional documentation and other files 514 may be attached to the schematic by selecting the Import Document tool button 516. When this button is clicked with the mouse, a standard file selector window (not shown) opens to allow the user to select any desired file within the computer's file system, which is then attached to the schematic as indicated by the attachment icons 514.

By selecting the background of the schematic 502 the user is able to open a global Parameter Editor window 517, within which parameters may be defined that are applied to the entire simulation, or to individual modules, e.g. 508, in the set-up as specified by the user. In the embodiment 500, the parameters are grouped within the parameter editor 517 into categories ("Global", "Player" and "Scheduler" are shown). In the embodiment shown in FIG. 5 the user is able to create new categories and add new parameters to existing categories using the functions provided by the parameter editor. When the application is adapted according to a preferred embodiment of the present invention, the user specifies those parameters that will be available to the user of the player application by simply placing the parameters within the "Player" category.

Figure 8:
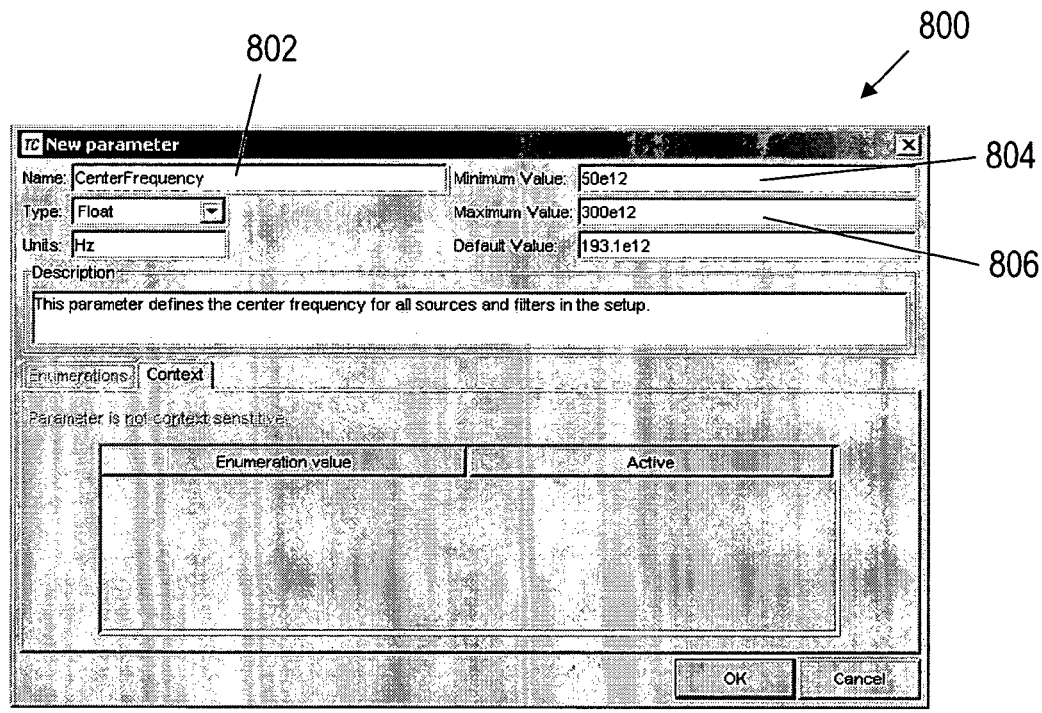
FIG. 8 shows a parameter definition dialog according to a preferred embodiment of the present invention.

FIG. 8 shows a dialog box 800 that may be used to define a new parameter. The user is able to enter the name of the parameter 802 (in the example "CenterFrequency"), as well as the minimum 804 and maximum 806 allowed values of the parameter. If the parameter is made available in the player application, the minimum and maximum values will define the range over which the end user is allowed to vary the parameter value. Alternatively, a parameter of an enumerated type may be defined (not shown), in which case rather than defining a range of values for the parameter, the user is able to specify a set of discrete values to which the parameter may be set.

Figure 9:
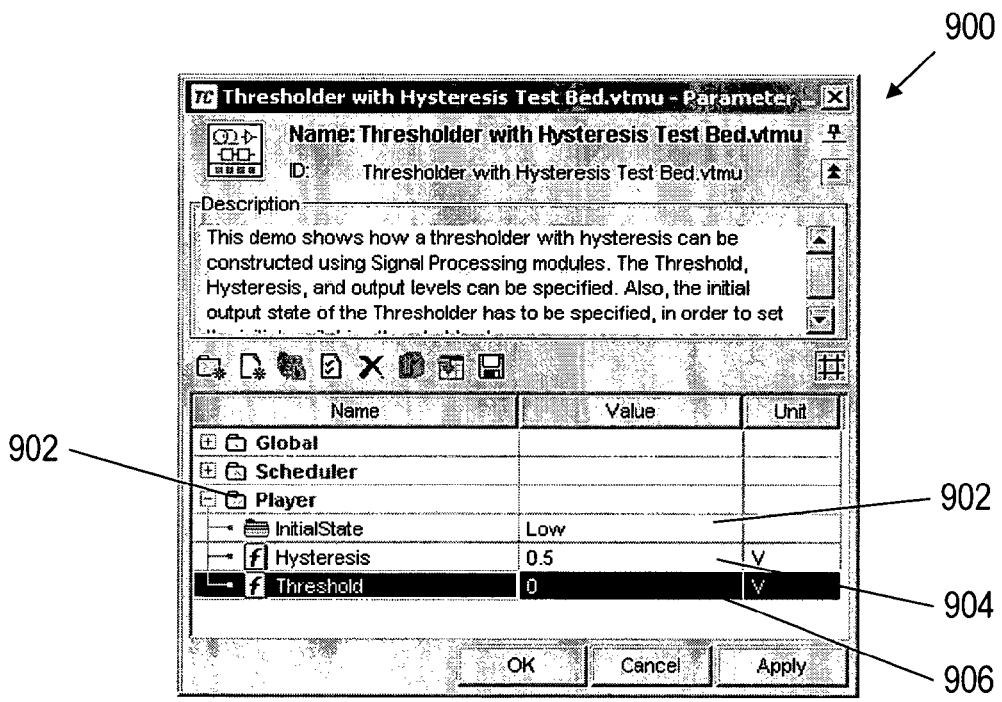
FIG. 9 shows a parameter editor window according to a preferred embodiment of the present invention.

FIG. 9 shows in more detail a global parameter editor window 900 in which the parameters, "InitialState" 902 (of enumerated type), "Hysteresis" 904 and "Threshold" 906 (of continuous types) have been defined and included within the "Player" category 902. Accordingly, when a simulation content file is created, these parameters will be made available to an end user of the player application.

The simulation set-up may be run, and the results viewed and verified, by pressing the Run button 518, and the set-up may be saved at any time by selecting the appropriate "save" option 520. It will be appreciated that a fully-featured simulation software application provides many other features related to the creation, maintenance, testing, development and execution of simulation set-ups, and that the features previously described are only those that are relevant to a description of the present invention.

Figure 11:
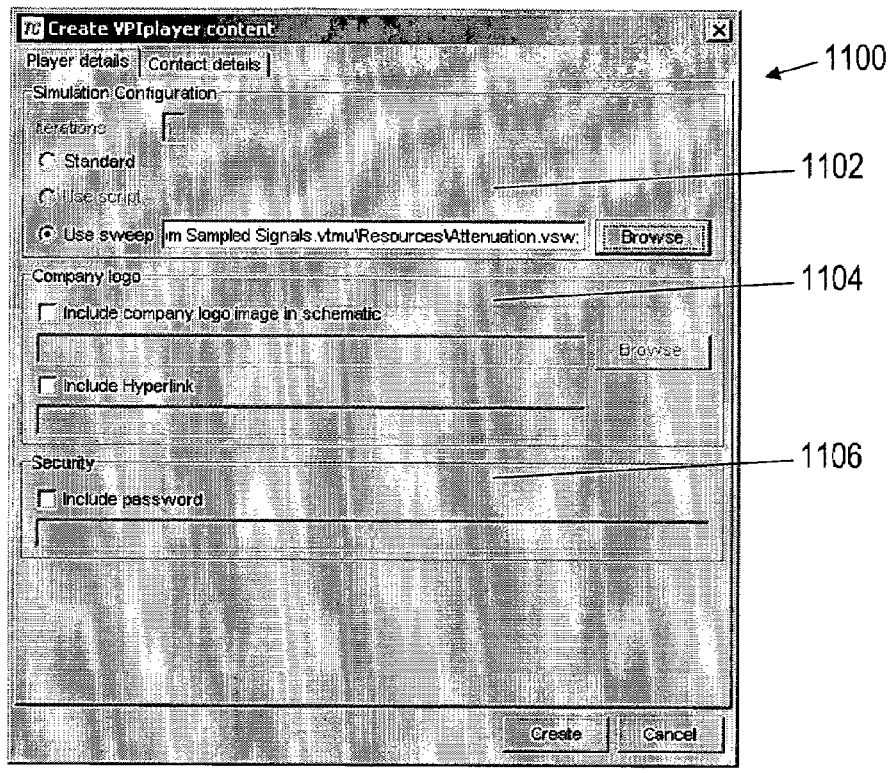
FIG. 11 shows a player details tab pane of a content creation dialog according to a preferred embodiment of the present invention.
Figure 12:
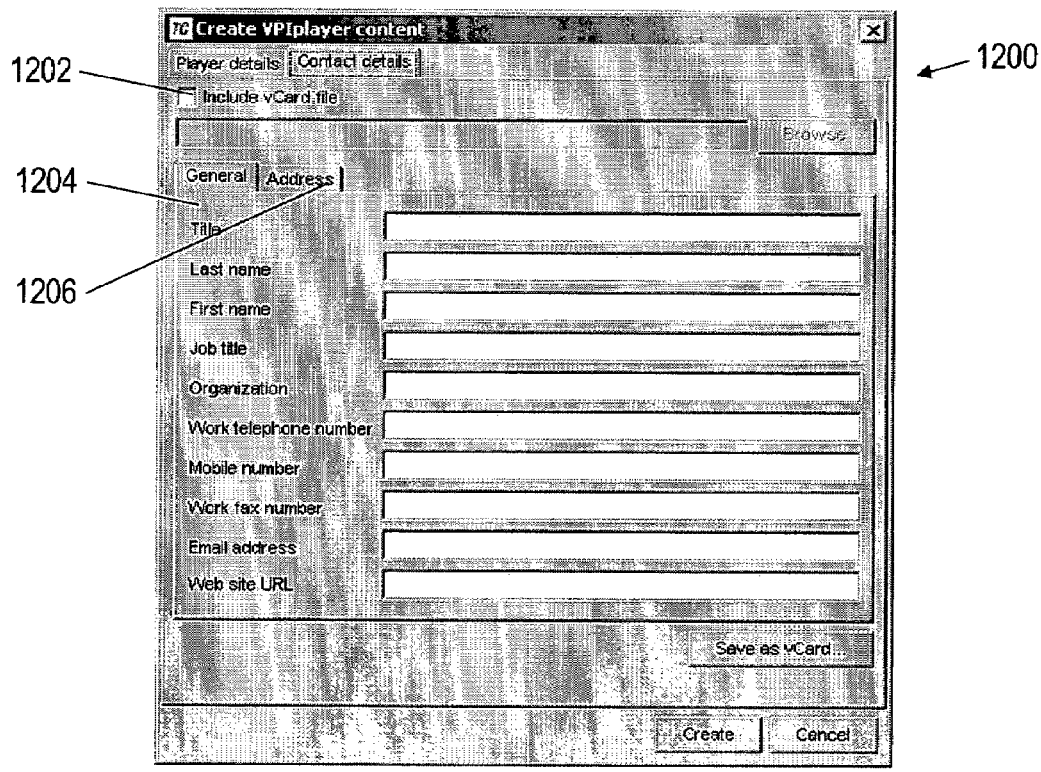
FIG. 12 shows a contact details tab pane of a content creation dialog according to a preferred embodiment of the present invention.

Once the simulation set-up has been created and tested, the user may create a simulation content file by selecting the corresponding menu option 522. During the process of content creation, the user may be prompted to provide the additional information contained within the content file, e.g. company logo 212, company World Wide Web URL 214, vCard contact details 218, and a password 216 if restricted access is desired for the content. In the preferred embodiment, this information is provided by way of a dialog box as shown in FIGS. 11 and 12. The dialog box 11 includes a "player details" tab pane as shown in FIG. 11, which includes entry regions for simulation configuration 1102 (which optionally enables alternative simulation instructions 204 to be provided), optional company logo and WWW URL 114 and optional password 1106. The "contact details" tab pane shown in FIG. 12 includes the option 1202 to provide details via a vCard file, or to provide contact details via the "general" 1204 and "address" tab panes.

The remaining information required in the content file is provided from the simulation set-up created by the user, e.g. the graphical representation 202 and the simulation instructions 204 are created from the schematic 502, the document attachments 210 and input data files 208 are created from the attachments 514 to the schematic, and the appropriate version number 220 is automatically included according to the current version of the simulation application 500.

The preceding paragraphs describe a common use-case for the preferred embodiment of the invention. This use-case is that the user first creates, tests and refines the simulation set-up using the fully-featured simulation software application. The features of the application used to do this are common between the application adapted according to the present invention, and a prior art simulation software application that is not able to create a simulation content file. Once the user is satisfied with the set-up in the application of the preferred embodiment, the simulation content file is created by the user selecting a specific function of the application using the menu option 522, that operates independently of the other functions of the application. Advantageously, this embodiment maximizes the ease of use of the application by a user already familiar with a prior art application, and may minimize the costs associated with the development and implementation of a simulation software application in accordance with the present invention. However, it will be appreciated by persons skilled in the art that many alternative embodiments of the fully-featured simulation software application are possible, and that such alternatives will fall within the scope of the present invention. For example, the simulation content file creation could be an option available under the standard "Save" function of the application, rather than being a separate menu option, or the simulation content file could be automatically created under certain circumstances, e.g. the successful completion of simulation, of closing of the schematic. Alternatively, a custom simulation software application could be implemented with the principle function being the creation of the simulation content file, and having reduced commonality with prior art simulation software applications.

Figure 6:
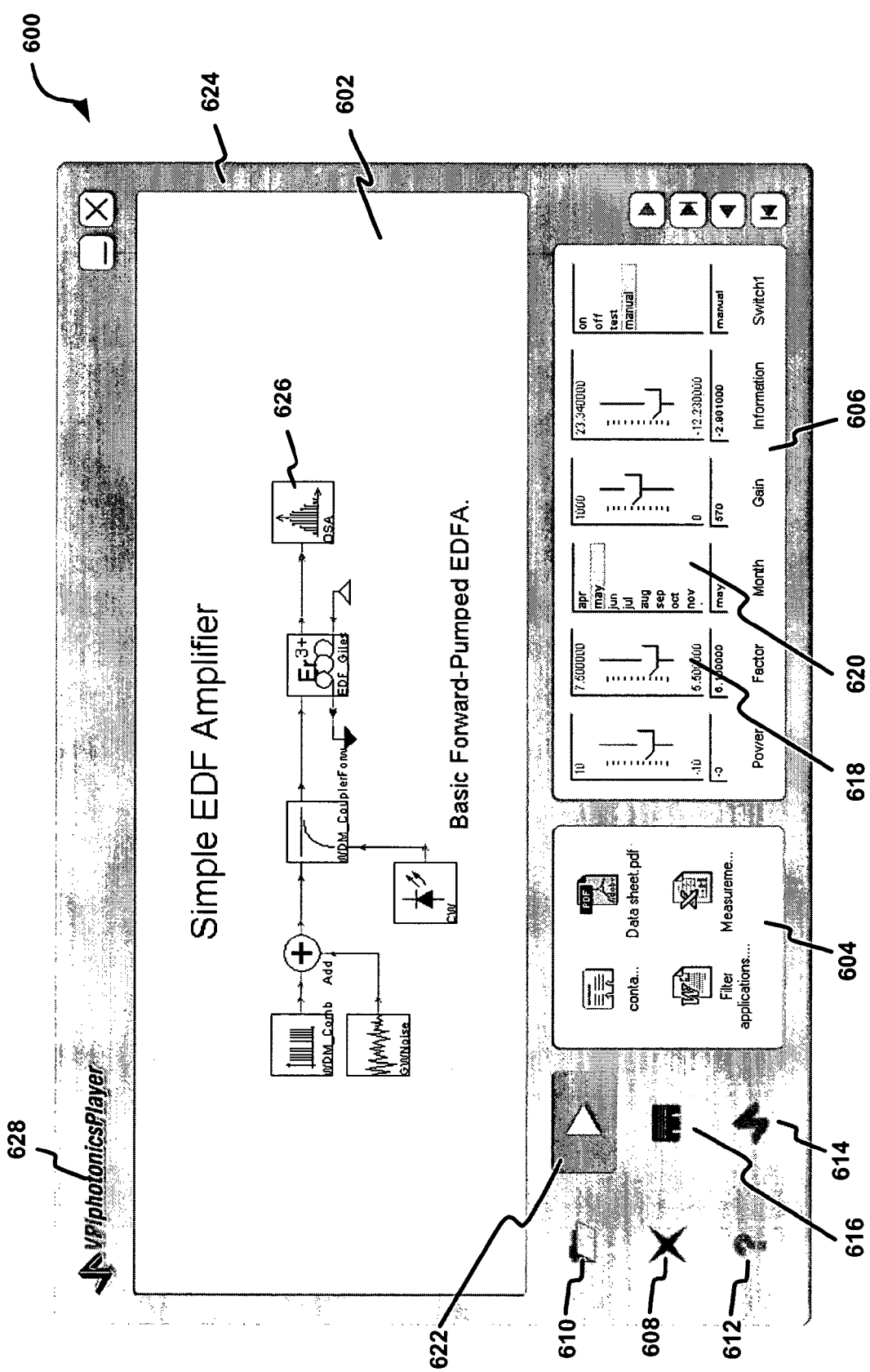
FIG. 6 shows the main application window of a player GUI application according to a preferred embodiment of the present invention.

FIG. 6 shows the application window 600 generated by a player application 310 according to a preferred embodiment of the present invention. The function of the player application, as previously described, is to read a simulation content file 125, and to enable the user to view the simulation set-up, manipulate the predetermined parameters, and run the simulation using the selected parameter settings. Note that the user of the player application 310 may be the same user who created the simulation content file using the fully-featured simulation software application, however it is anticipated that in general the user of the player application 310 will be a different user, typically located at a site remote from that at which the simulation content file was created. For example, the user who created the simulation content file may use the player application to confirm that the content has been correctly created, and that the simulation set-up operates as intended. However, the completed simulation content file may then be distributed, e.g. via download from a web site, or on storage media such as CD-ROM, to remote users of the player application 310. The remote users may be, e.g., colleagues or customers of the user who created the simulation content file. In any case, the remote users need not own a copy of the fully-featured simulation software application. Furthermore, if they do not already possess the player application, it may be made available to them, e.g. via similar distribution means to those used to distribute the simulation content file such as a web download, or on CD-ROM.

The player application 310 reads in the simulation content file 125 and constructs the player window 600 according to the content of the file. First, the player application verifies that the version identification 220 in the simulation content file is compatible with the current player application version. If not, then the player application will generate a suitable error message and then exit without displaying the contents of the simulation content file. Otherwise, if a password 216 is defined within the content file 125, the player application 310 will present the user with a dialog box requesting that the password be entered. If the user is unable to enter the correct password then again the player application will generate an error message and exit. If the version number is compatible, and the correct password is entered (if required), then the player application 310 will proceed to create the contents of the player window 600 in accordance with the contents of the simulation content file 125.

In the embodiment shown in FIG. 6, the graphical representation of the simulation schematic set-up 202 from the simulation content file 125 is displayed in a pane 602 of the window 600. In the preferred embodiment, the graphical representation 202 uses the SVG format, and the user is able to pan and zoom over the full schematic using clicks and drags of the mouse pointer within the pane 602. Additionally, if a company logo 212 is contained within the simulation content file 125, then the player will display the logo within the simulation schematic pane 602.

The player application 310 also extracts any document attachments 210 stored within the simulation content file, and stores them as separate files within the local file system of the computer upon which the player application is running. These document attachments are then displayed in a pane 604 of the main window, using the Explorer Control 425 to represent each document as an icon the appearance of which depends upon the file type of the document. The user can open any of these documents by double-clicking with the mouse on the corresponding icon.

The player application 310 additionally extracts the parameter definitions 206 from the simulation content file. Each parameter definition consists of at least the parameter name and either a range of allowed values (in the case of a continuously variable parameter), or a list of legal values. The controllable parameters defined in the content file are displayed in a pane 606 of the main window, using the slider panel control 430. The values of continuously variable parameters are represented using slider controls, e.g. 618, whereas the values of list parameters are represented using list controls e.g. 620. The user is able to change the controllable parameters by adjusting the slider controls, e.g. 618, by clicking and dragging the tabs with the mouse, or selecting items from the list controls, e.g. 620, by simply clicking with the mouse upon the desired value.

The player application also provides a number of buttons upon which the user can click using the mouse to perform a number of simple functions. For example, in the embodiment 600 buttons are provided so that the user can close 608 the current content file, open 610 a new content file, obtain help 612 on using the player, and obtain information 614 about the supplier of the player and simulation applications. If the player application finds company contact information 218 or Web contact information 214 for the supplier of the simulation content file within the file, then the user may contact the supplier via e.g. email or the Word Wide Web, by clicking on the contact button 616.

Figure 7:
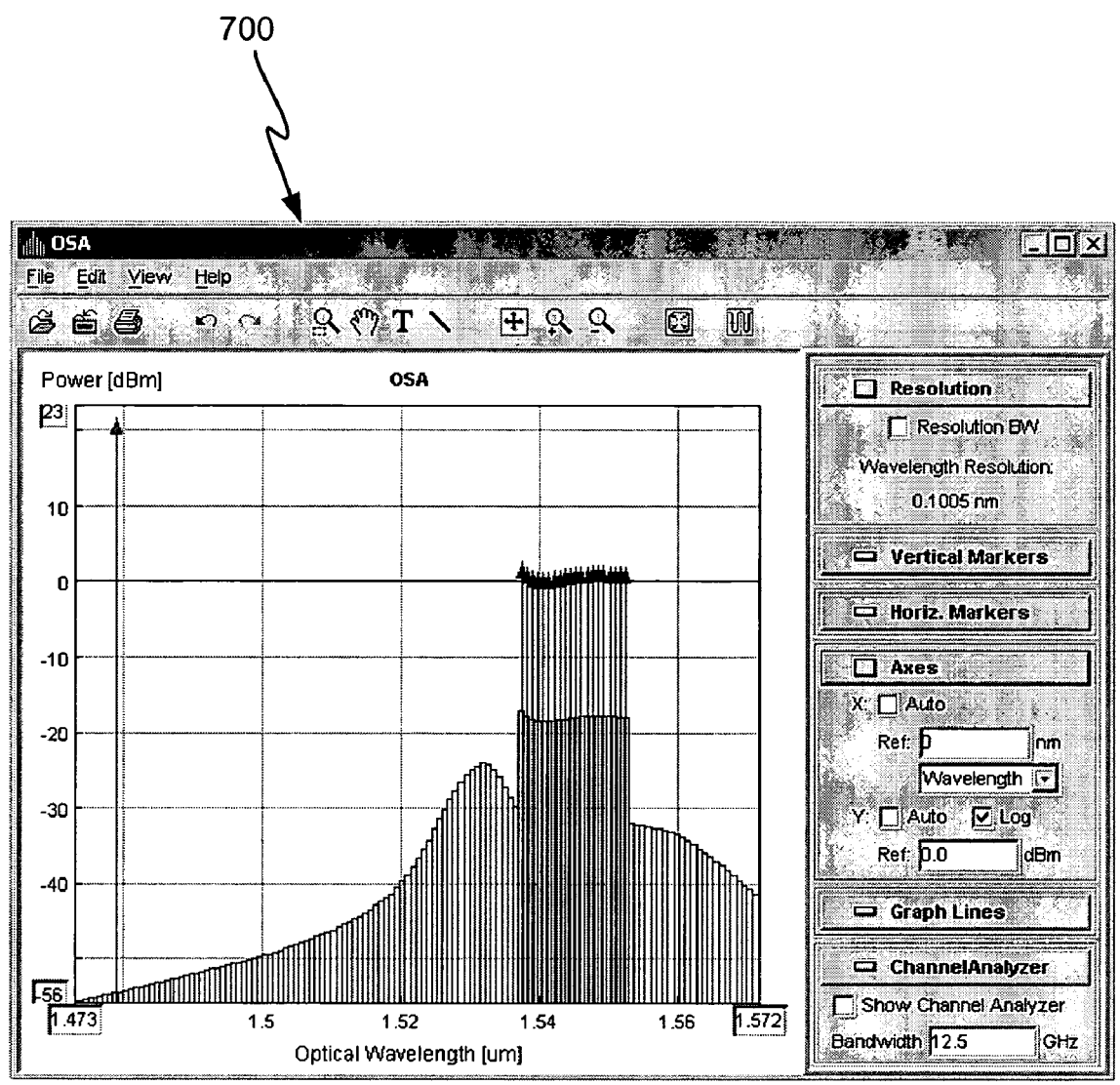
FIG. 7 shows a visualizer results window according to a preferred embodiment of the present invention.

Once the desired parameter settings have been made, the user is able to run the simulation by pressing the play button 622. This causes the player application to commence execution of the simulation engine 315, passing to it the simulation instructions 205 that are stored within the simulation content file 125. The simulation engine then executes the instructions, which cause the simulation models represented by each component in the simulation set-up to be run in turn. The results of the simulation execution naturally depend upon the exact content of the simulation set-up created by the user of the fully-featured simulation software application 100 and subsequently stored in the simulation content file 125. For example, the simulation set-up shown in the example player application window 600 includes a visualization module 626. When the simulation is run, a visualizer window 700 will be displayed by the visualization engine 320, as shown in FIG. 7. The results shown in the visualizer window 700 may depend upon the settings of the controllable parameters 606, and therefore by varying the controllable parameters and then re-running the simulation by clicking on the run button 622 the user is able to view the outputs of the simulation for a range of component or system parameters as allowed by the content creator.

Note that advantageously the general appearance of the application window 600, including the border 624, the title bar 628 and the buttons 610-616, 622 are defined via the HTML layer 410, and can therefore be changed without any changes to the code in the executable program code 405. Thus, for example, a player content provider may be able to distribute a version of the player in which the general appearance has been altered to provide "branding" in the form of designs and logos that promote the business of the content provider.

Figure 10:
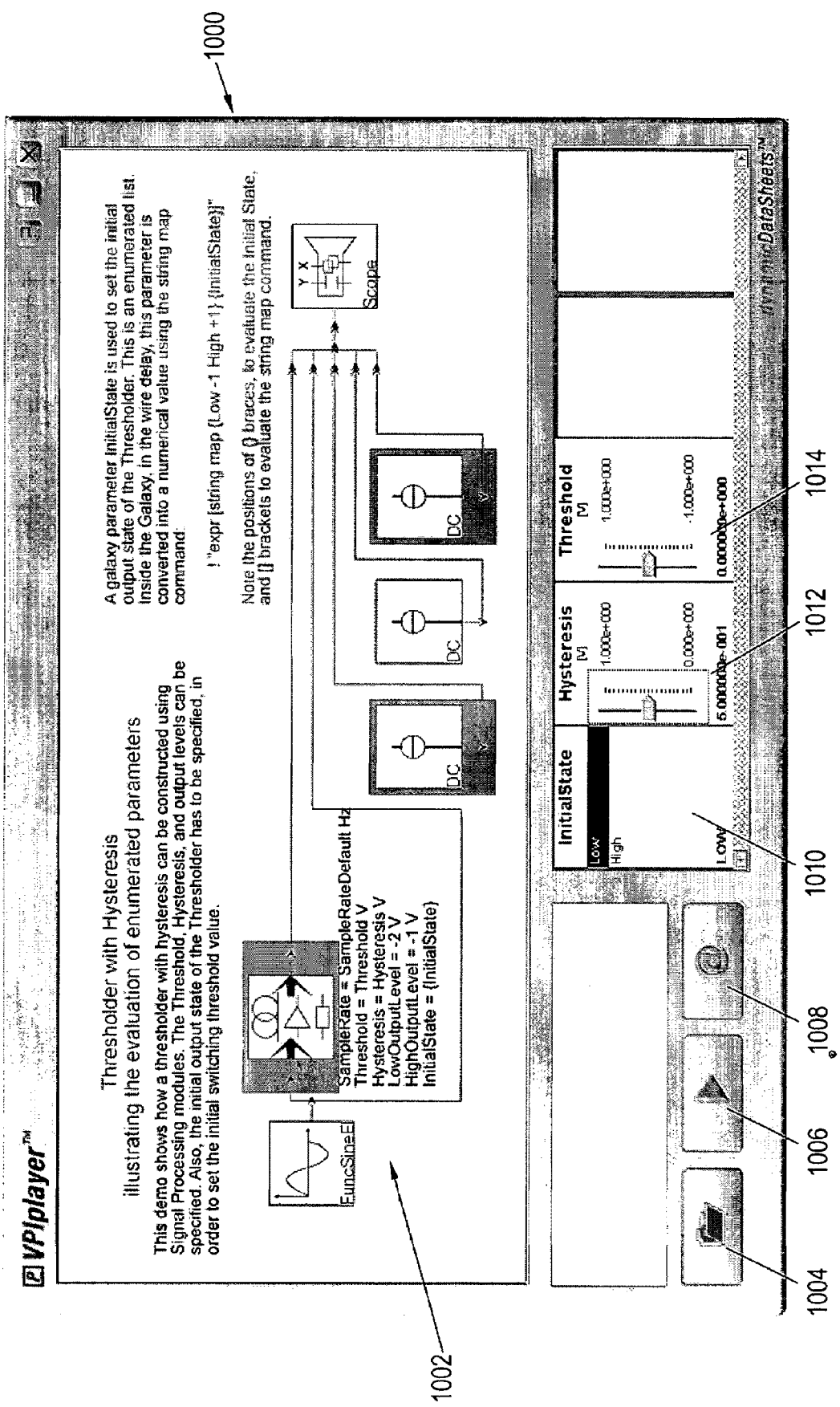
FIG. 10 shows the main application window of an alternative player GUI application according to a preferred embodiment of the present invention.

FIG. 10 shows an alternative embodiment of the player application GUI 1000, showing the graphical representation of a simulation model in the pane 1002. Buttons 1004, 1006, 1008 are provided to enable the end user to open a new content file, run the simulation model, and access contact details. The available parameters "InitialState" 1010, "Hysteresis" 1012 and "Threshold" 1014 correspond to the parameters shown in the "player" category of the parameter editor window 900. It can be seen in FIG. 10 that "InitialState" is an enumerated parameter having the discrete allowed values "Low" and "High", "Hysteresis" may be varied in the range 0.0 to 1.0, and "Threshold" may be varied in the range −1.0 to 1.0.

Figure 13:
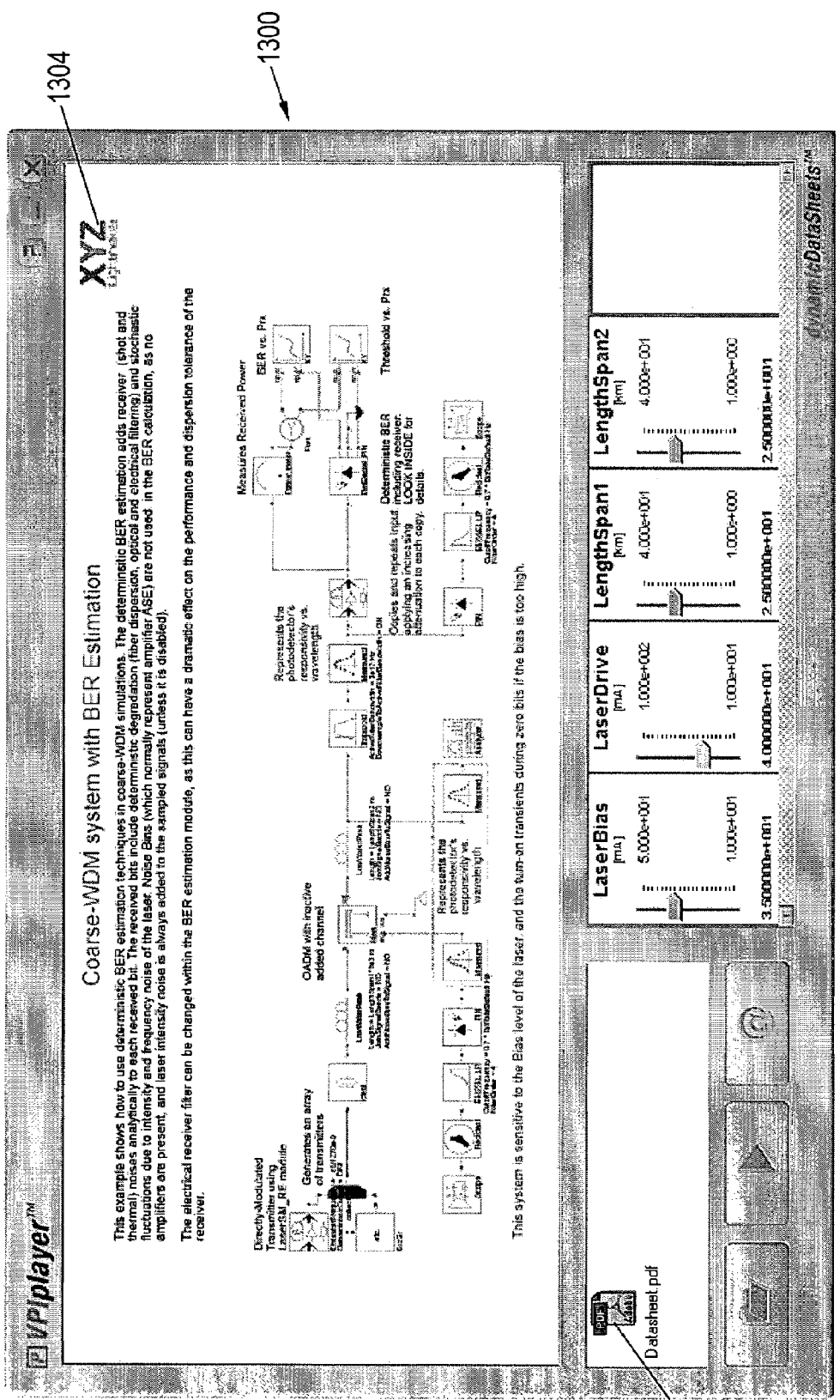
FIG. 13 shows the main application window of the alternative player GUI application displaying an attached datasheet and company logo according to a preferred embodiment of the present invention

FIG. 13 shows a further simulation model displayed in the player application GUI 1300. In this case the simulation content file includes an attached document 1302, and a digital image "XYZ Lightmaker" 1304, being the logo of a vendor company promoting the products demonstrated by the simulation model. If a WWW URL was also included in the simulation content file, then when the end user clicks on the logo 1304, the default web browser will open at the URL specified by the content creator.

It will be understood that the invention disclosed and defined herein extends to all alternative combinations of two or more of the individual features mentioned or evident from the text or drawings. All of these different combinations constitute various alternative aspects of the invention. Furthermore, although the invention has been described with reference to a preferred embodiment in which optical, optoelectronic and electronic systems and components are simulated, it will be appreciated that there may be other types of design automation systems to which the invention may be applied.

The foregoing describes embodiments of the present invention and modifications, obvious to those skilled in the art can be made thereto, without departing from the spirit of the invention or the scope of the appended claims.

We claim:

1. A system for providing a computer simulation system model comprising:
- a first computer configured for:
  - enabling a designer to create a runnable simulation system model including interconnected component or subsystem models; and
  - creating a simulation content file that includes information describing the simulation system model; and
- a second computer including a computer-implemented simulation player configured for:
  - reading the simulation content file;
  - displaying to a user of the simulation player a schematic diagram of the simulation system model created by the designer; and
  - running the simulation system model using the information in the simulation content file,
- wherein the simulation content file includes a collection of data to enable the simulation player to display the schematic diagram, and to execute the simulation system model,
- wherein the displaying the schematic diagram or the running the simulation system model prohibit the user of the simulation player from displaying the schematic diagram or running the simulation system model for the purpose of modifying the simulation system model by adding or removing any of the component models, subsystem models or interconnections of the simulation system model, and
- wherein results of the running the simulation system model using the information in the simulation content file are presented to the user of the simulation player via the displaying.

2. The system of claim 1 wherein the enabling includes the designer to identify parameters of the simulation system model, component models or subsystem models that are configured to be inspected or varied by the user of the simulation player, and to specify one or more allowed values of said parameters,
- wherein the simulation content file further includes information identifying said parameters and allowed values, and
- wherein the displaying includes enabling the user of the simulation player to vary only said identified parameters of the simulation system model, component models or subsystem models to only said allowed values.

3. The system of claim 1 wherein the simulation system model comprises an optical, opto-electronic or electronic simulation model.

4. The system of claim 1 wherein the information describing the simulation system model includes information specifying the component models or subsystem models comprising the simulation system model, and the interconnections therebetween.

5. The system of claim 1 wherein the information describing the simulation system model includes simulation instructions specifying a sequence of operations to be carried out during running of the simulation system model by the simulation player.

6. The system of claim 1 wherein the information describing the simulation system model includes information defining a graphical representation of the simulation system which is utilized to display the schematic diagram of the simulation system model.

7. The system of claim 1 wherein the creating includes encrypting at least a part of the simulation content file to prevent unauthorized parties from accessing or altering the information describing the simulation system model.

8. The system of claim 2 wherein the allowed values of said parameters comprise one or both of a range of values specified as a minimum value and a maximum value, and a list of discrete values.

9. The system of claim 1 wherein the simulation content file further comprises content including one or more of data or document files, a digital image, a web site URL, and contact details, and wherein the designer is able to control the creating to include said content at the time of creation of the file.

10. The system of claim 9 wherein the simulation system model comprises a model of a component or system product, and the computer simulation model is provided for distribution by a vendor for evaluation of said product by prospective customers.

11. The system of claim 10 wherein the document or data files comprise data and promotional information relating to said product, and the simulation player is configured to enable the enable the user of the simulation player to open said files and inspect their contents.

12. The system of claim 10 wherein the digital image comprises a company logo of said vendor, and the displaying includes displaying the logo on a computer display.

13. The system of claim 10 wherein the web site URL identifies a web site of said vendor, and the displaying includes enabling the user of the simulation player to open a web browser at said web site.

14. The system of claim 10 wherein the contact details include one or more of a physical address, an email address, a telephone number and a fax number, and the displaying includes displaying said contact details on a computer display.

15. A method of providing a computer simulation system model comprising the steps of:
- one or more computer systems receiving a runnable simulation system model created by a designer, said simulation system model including interconnected component or subsystem models;
- the one or more computer systems creating a computer-readable simulation content file that includes information describing the simulation system model;
- providing the simulation content file to a computer system including a computer-implemented simulation player, wherein the simulation content file includes a collection of data to enable the simulation player to display the schematic diagram, and to run the simulation system model;
- the computer-implemented simulation player providing a graphical user interface on the computer system including the simulation player which displays a schematic diagram of the simulation system model;
- the computer-implemented simulation player further enabling a user of the simulation player to run the simulation system model via the graphical user interface while prohibiting its use by the user of the simulation player for the purpose of modifying the simulation system model by adding or removing any of the component models, subsystem models or interconnections of the simulation system model;
- the computer-implemented simulation player running the simulation model; and
- the computer-implemented simulation player presenting simulation results via the graphical user interface of the computer system including the simulation player.

16. The method of claim 15, further comprising the steps of:
- the computer-implemented simulation player receiving input from the simulation content file identifying parameters of the simulation system model, component models or subsystem models that are configured to be inspected or varied, and specifying one or more allowed values of said parameters; and
- the computer-implemented simulation player receiving input varying said identified parameters of the simulation system model, component models or subsystem models to said allowed values.

17. The method of claim 15 wherein the simulation system model comprises an optical, opto-electronic or electronic simulation model.

18. The method of claim 15 wherein the step of providing the simulation content file to the computer system including the simulation player comprises distributing the file using an information network.

19. The method of claim 18 wherein the information network is the internet.

20. The method of claim 18 wherein said step of distributing includes making the simulation content file available for download from a web site.

21. A tangible computer-readable medium having computer readable instructions stored thereon for performing a method of providing a computer simulation system model comprising the steps of:
- providing a computer-implemented design automation environment for enabling a designer to create a runnable simulation system model including interconnected component or subsystem models; and
- creating a simulation content file that includes information describing the simulation system model,
- wherein the simulation content file is adapted for use with a computer-implemented simulation player which is configured for:
  - reading the simulation content file;
  - displaying to a user of the simulation player a schematic diagram of the simulation system model created by the designer; and
  - running the simulation system model using the information in the simulation content file,
- wherein the simulation content file includes a collection of data to enable the simulation player to display the schematic diagram, and to run the simulation system model,
- wherein the displaying the schematic diagram or the running the simulation system model prohibit the user of the simulation player from displaying the schematic diagram or running the simulation system model for the purpose of modifying the simulation system model by adding or removing any of the component models, subsystem models or interconnections of the simulation system models, and
- wherein the computer-implemented simulation player is adapted to present results of running the simulation systems model using the information in the simulation content file, via the displaying.

22. The computer-readable medium of claim 21 wherein said computer-implemented design automation environment enables the designer to identify parameters of the simulation system model, component models or subsystem models that are configured to be inspected or varied by the user of the simulation player, and to specify one or more allowed values of said parameters that are configured to be set by the user of the simulation player, and
wherein said step of creating a simulation content file comprises including with said file information identifying said identified parameters and allowed values.

23. The computer-readable medium of claim 21 wherein the simulation system model comprises an optical, opto-electronic or electronic simulation model.

24. The computer-readable medium of claim 21 wherein the information describing the simulation system model includes information specifying the component models or subsystem models comprising the simulation system model, and the interconnections therebetween.

25. The computer-readable medium of claim 21 wherein the information describing the simulation system model includes simulation instructions specifying a sequence of operations to be carried out during running of the simulation system model by the computer-implemented simulation player.

26. The computer-readable medium of claim 22 wherein the allowed values of said parameters comprise one or both of a range of values specified as a minimum value and a maximum value, and a list of discrete values.

27. The computer-readable medium of claim 21 wherein said step of creating the simulation content file includes encrypting at least a part of the simulation content file to prevent unauthorized parties from accessing or altering the information describing the simulation model.

28. The computer-readable medium of claim 21 wherein said computer-implemented design automation environment comprises a computer-executable software component adapted to perform said step of creating a simulation content file.

29. The computer-readable medium of claim 28 wherein the simulation content file further comprises content including one or more of data or document files, a digital image, a web site URL, and contact details, the simulation content file including said content at the time of creation.

30. The computer-readable medium of claim 29 wherein the simulation system model comprises a model of a component or system product.

31. A tangible computer-readable medium having computer readable instructions stored thereon for performing a method comprising the steps of:
- reading a simulation content file that includes information describing a runnable simulation system model created by a designer, which system model includes interconnected component or subsystem models; and
- providing a computer-implemented simulation player environment which is configured for:
  - reading the simulation content file;
  - displaying to a user of the simulation player environment a schematic diagram of the simulation system model created by the designer; and
  - running the simulation system model using the information in the simulation content file,
- wherein the simulation content file includes a collection of data to enable the simulation player environment to display the schematic diagram, and to run the simulation system model,
- wherein the displaying the schematic diagram or the running the simulation system model prohibit the user of the simulation player environment from displaying the schematic diagram or running the simulation system model for the purpose of modifying the simulation model by adding or removing any of the component models, subsystem models or interconnections of the simulation system model, and wherein results of running the simulation system model using the information in the simulation content file are presented to the user of the simulation player environment via the displaying.

32. The computer-readable medium of claim 31 wherein the simulation content file farther includes information identifying parameters of the simulation system model, component models or subsystem models that are configured to be inspected or varied by the user of the simulation player environment, and one or more allowed values of said parameters, and wherein said computer-implemented simulation player environment enables the user of the simulation player environment vary only said identified parameters to only said allowed values.

33. The computer-readable medium of claim 31 wherein the simulation system model comprises an optical, opto-electronic or electronic simulation model.

34. The computer-readable medium of claim 31 wherein the information describing the simulation system model includes information defining a graphical representation of the simulation system model, and wherein the graphical user interface of the computer-implemented simulation player environment utilizes said graphical representation to display the schematic diagram of the simulation system model.

35. The computer-readable medium of claim 31 wherein said computer-implemented simulation player environment comprises a computer-executable software component adapted to perform said reading the simulation content file.

36. The computer-readable medium of claim 31 wherein the simulation content file further comprises content including one or more of data or document files, a digital image, a web site URL, and contact details.

37. The computer program product of claim 36 wherein the simulation system model comprises a model of a component or system product.

38. The computer-readable medium of claim 37 wherein the document or data files comprise data and promotional information relating to said product, and the simulation player software environment enables the user of the simulation player environment to open said files and inspect their contents.

39. The computer-readable medium of claim 37 wherein the digital image comprises a company logo of said vendor, and the displaying in the computer-implemented simulation player environment includes displaying the logo on a computer display.

40. The computer-readable medium of claim 37 wherein the web site URL identifies a web site of a vendor, and the displaying in the computer-implemented simulation player environment includes enabling the user of the simulation player environment to open a web browser at said web site.

41. The computer-readable medium of claim 37 wherein the contact details include one or more of a physical address, an email address, a telephone number and a fax number, and the displaying in the computer-implemented simulation player environment includes displaying said contact details on a computer display.

42. A system for providing a computer simulation system model comprising optical, opto-electronic or electronic components, said system comprising:
a first computer configured for:
enabling a designer to create a runnable simulation system model of optical, opto-electronic or electronic components or systems, including interconnected component or subsystem models; and
creating a simulation content file that includes information describing the simulation system model; and
a second computer including a computer-implemented simulation player configured for:
reading the simulation content file;
displaying to a user of the simulation player a schematic diagram of the simulation system model created by the designer; and
running the simulation system model using the information in the simulation content file,
wherein the simulation content file includes a collection of data to enable the simulation player to display the schematic diagram, and to run the simulation system model,
wherein the displaying the schematic diagram or the running the simulation system model prohibit the user of the simulation player from displaying the schematic diagram or running the simulation system model for the purpose of modifying the simulation system model by adding or removing any of the component models, subsystem models or interconnections of the simulation system model, and
wherein results of the running the simulation system model using the information in the simulation content file are presented to the user of the simulation player via the displaying.

43. The system of claim 42 wherein the enabling includes enabling the designer to identify parameters of the simulation system model, component models or subsystem models that are configured to be inspected or varied by the user of the simulation player, and to specify one or more allowed values of said parameters,
wherein the simulation content file further includes information identifying said parameters and allowed values, and
wherein the displaying includes enabling the user of the simulation player to vary only said identified parameters of the simulation model, component models or subsystem models to only said allowed values.

44. The system of claim 42 wherein the simulation content file further includes one or more of data or document files, a digital image, a web site URL, and contact details.

45. The system of claim 44 wherein:
the simulation system model comprises a model of an optical, opto-electronic or electronic component or system product, and the computer simulation model is provided for distribution by a vendor for evaluation of said product by prospective customers;
the document or data files comprise data and promotional information relating to said component or system product, and the simulation player is adapted to enable the user of the simulation player to open said files and inspect their contents;
the digital image comprises a company logo of said vendor, and the displaying includes displaying the logo on a computer display;
the web site URL identifies a web site of said vendor, and the displaying includes enabling the user of the simulation player to open a web browser at said web site; and
the contact details include one or more of a physical address, an email address, a telephone number and a fax number, and the displaying includes displaying said contact details on the computer display.

46. A method of providing a computer simulation system model comprising optical, opto-electronic or electronic components, said method comprising the steps of:
one or more computer systems receiving a runnable simulation system model comprising optical, opto-electronic or electronic components or systems, created by a designer, said simulation model including interconnected component or subsystem models;

the one or more computer systems creating a computer-readable simulation content file that includes information describing the simulation system model;

providing the simulation content file to a computer system including a computer-implemented simulation player, wherein the simulation content file includes a collection of data to enable the simulation player to display the schematic diagram, and to run the simulation system model;

the computer-implemented simulation player providing a graphical user interface on the computer system including the simulation player which displays a schematic diagram of the simulation system model;

the computer-implemented simulation player enabling a user of the simulation player to run the simulation system model via the graphical user interface while prohibiting its use by the user of the simulation player for the purpose of modifying the simulation system model by adding or removing any of the component models, subsystem models or interconnections of the simulation system model;

the computer-implemented simulation player running the simulation model; and the computer-implemented simulation player presenting simulation results via the graphical user interface of the computer system including the simulation player.

47. The method of claim 46, further comprising the steps of:

the computer-implemented simulation player receiving input identifying parameters of the simulation system model, component models or subsystem models that are configured to be inspected or varied, and specifying one or more allowed values of said parameters, wherein the simulation content file further includes information identifying said parameters and allowed values, and the computer-implemented simulation player receiving input varying said identified parameters of the simulation model, component models or subsystem models to said allowed values.

48. A tangible computer-readable medium having computer-readable instructions stored thereon, for performing a method of providing a computer simulation system model comprising the steps of:

providing a computer-implemented design automation environment for enabling a designer to create a runnable simulation system model comprising optical, opto-electronic or electronic components, including interconnected component or subsystem models; and creating a simulation content file that includes information describing the simulation system model, wherein the simulation content file is adapted for use with a computer-implemented simulation player which is configured for:

reading the simulation content file;

displaying to a user of the simulation player a schematic diagram of the simulation system model created by the designer;

running the simulation system model using the information in the simulation content file;

wherein the simulation content file includes a collection of data to enable the simulation player to display the schematic diagram, and to run the simulation system model, wherein the displaying the schematic diagram or the running the simulation system model prohibit the user of the simulation player from displaying the schematic diagram or running the simulation system model for the purpose modifying the simulation system model by adding or removing any of the component models, subsystem models or interconnections of the simulation system models, and wherein the computer-implemented simulation player is adapted to present results of the running the simulation system model using the information in the simulation content file, via the displaying.

49. The computer-readable medium of claim 48 wherein said computer-implemented design automation environment enables the designer to identify parameters of the simulation system model, component models or subsystem models that are configured to be inspected or varied by the user of the simulation player, and to specify one or more allowed values of said parameters that are configured to be set by the user of the simulation player, and wherein said steps of creating the simulation content file comprises including with said file information identifying said identified parameters and allowed values.

50. The computer-readable medium product of claim 48 wherein the simulation content file further includes one or more of data or document files, a digital image, a web site URL, and contact details.

51. The computer-readable medium of claim 50 wherein:

the simulation system model comprises a model of an optical, opto-electronic or electronic component or system product, and the computer simulation model is provided for distribution by a vendor for evaluation of said product by prospective customers;

the document or data files comprise data and promotional information relating to said component or system product, and the simulation player is adapted to enable the user of the simulation player to open said files and inspect their contents;

the digital image comprises a company logo of said vendor, and the displaying includes displaying the logo on a computer display;

the web site URL identifies a web site of said vendor, and the displaying includes enabling the user of the simulation player to open a web browser at said web site; and the contact details include one or more of a physical address, an email address, a telephone number and a fax number, and the displaying includes displaying said contact details on the computer display.

52. A tangible computer-readable medium having computer-readable instructions stored thereon, for performing a method comprising the steps of:

reading a simulation content file that includes information describing a runnable optical, opto-electronic or electronic simulation system model created by a designer, which model includes interconnected component or subsystem models, and providing a computer-implemented simulation player environment which is configured for:

reading the simulation content file;

displaying to a user of the simulation player environment a schematic diagram of the simulation system model created by the designer; and running the simulation system model using the information in the simulation content file, wherein the simulation content file includes a collection of data to enable the simulation player to display the schematic diagram, and to run the simulation system model, wherein the displaying the schematic diagram or the running the simulation system model prohibit the user of the simulation player environment from displaying the schematic diagram or running the simulation system model for the purpose of modifying the simulation system model by adding or removing any of the component models, subsystem models or interconnections of the simulation system model, and wherein results of the running the simulation system model using the information in the simulation content file are presented to the user of the simulation player via the displaying.

* * * * *

UNITED STATES PATENT AND TRADEMARK OFFICE
CERTIFICATE OF CORRECTION

PATENT NO. : 7,451,069 B2  Page 1 of 1
APPLICATION NO. : 10/713052
DATED : November 11, 2008
INVENTOR(S) : Rudolf Moosburger et al.

It is certified that error appears in the above-identified patent and that said Letters Patent is hereby corrected as shown below:

In the Claims section, Column 17, Claim 2, Line 34:
    Please replace "enabling includes the designer" with --enabling includes enabling the designer--.

In the Claims section, Column 17, Claim 6, Line 63:
    Please replace "Simulation system which is utilized" with --simulation system model which is utilized--.

In the Claims section, Column 18, Claim 11, Line 20:
    Please replace "to enable the enable the user of" with --to enable the user of--.

In the Claims section, Column 21, Claim 32, Line 6:
    Please replace "content file farther includes" with --content file further includes--.

In the Claims section, Column 21, Claim 32, Line 14:
    Please replace "environment vary only" with --environment to vary only--.

Signed and Sealed this

Thirtieth Day of June, 2009

JOHN DOLL
*Acting Director of the United States Patent and Trademark Office*